United States Patent Office 2,838,965
Patented June 17, 1958

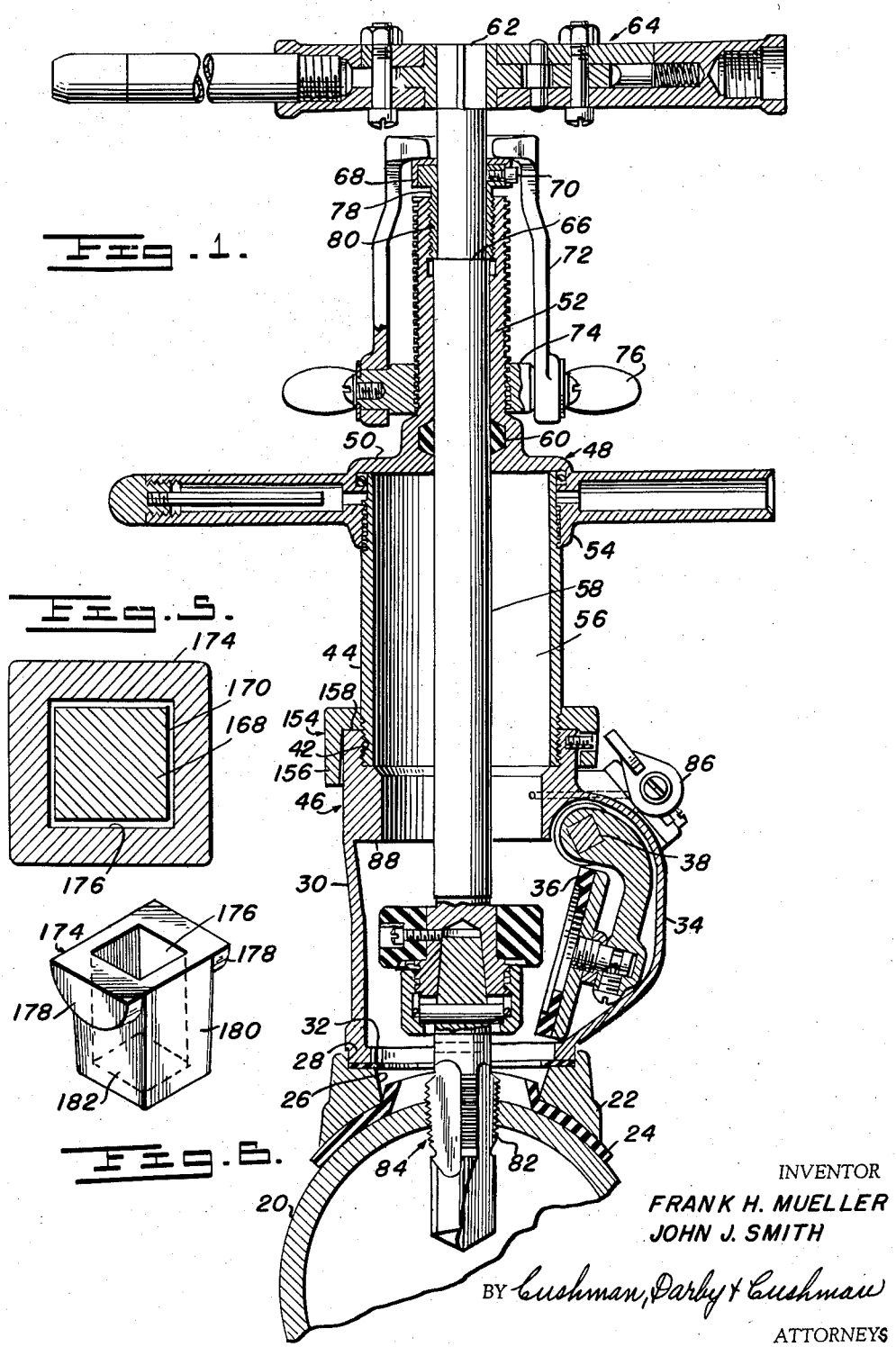

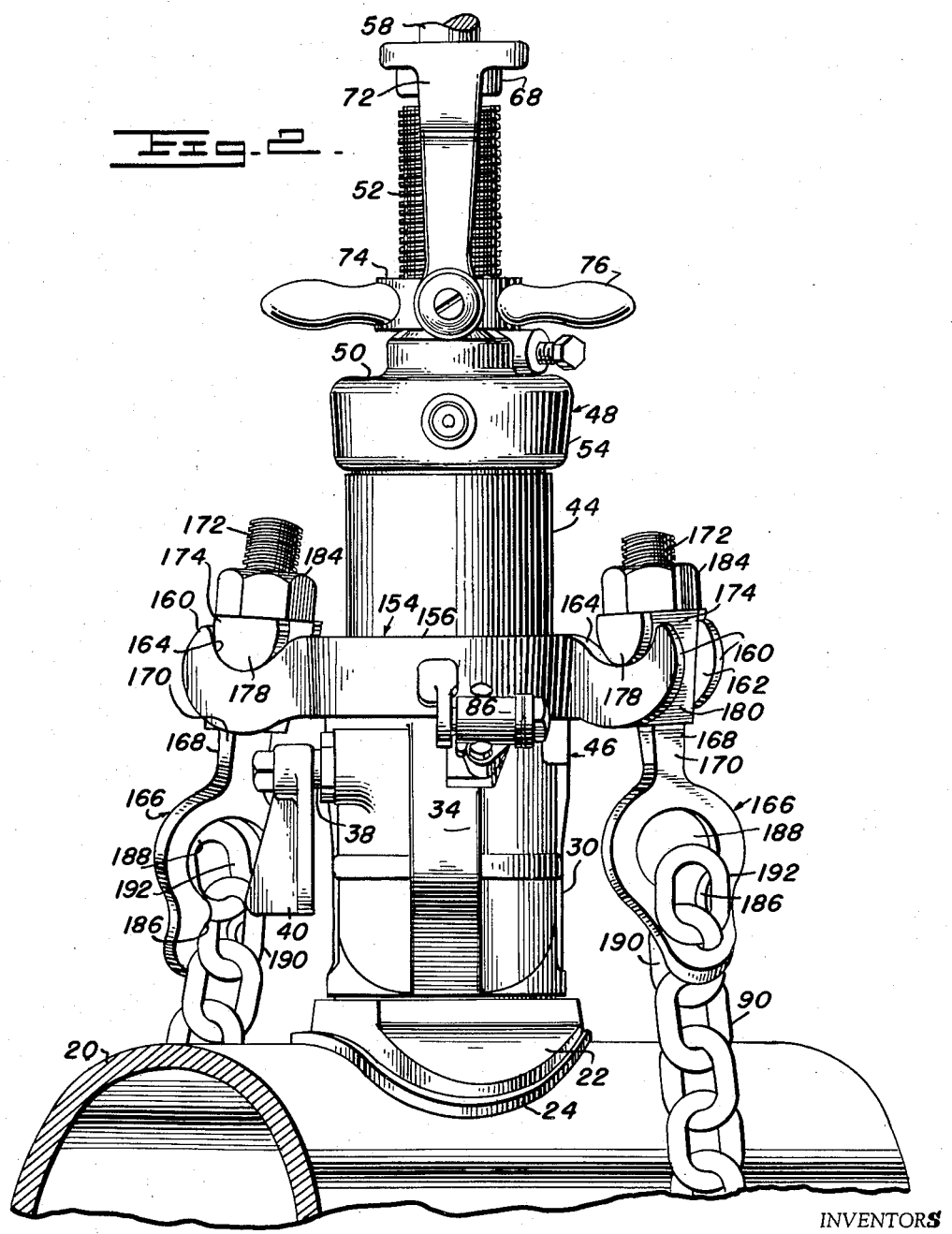

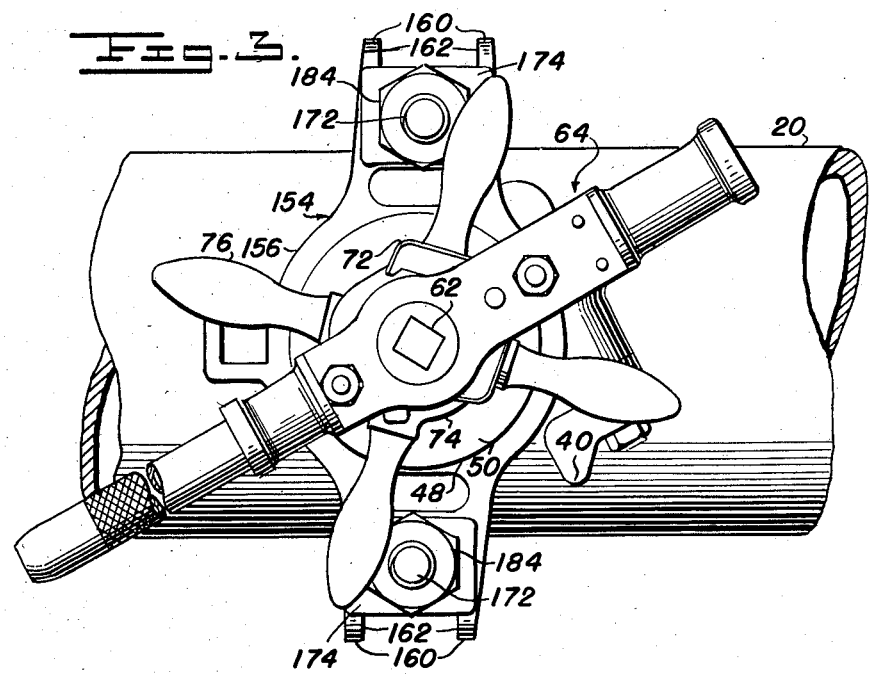
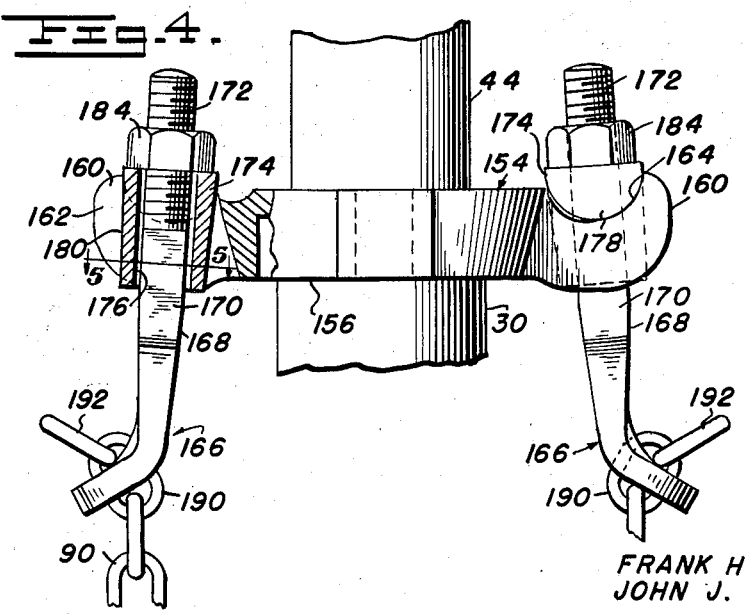
INVENTOR
FRANK H. MUELLER
JOHN J. SMITH
BY Cushman, Darby & Cushman
ATTORNEYS

2,838,965

MACHINE FOR DRILLING AND TAPPING MAINS

Frank H. Mueller and John J. Smith, Decatur, Ill., assignors to Mueller Co., Decatur, Ill., a corporation of Illinois Original application February 19, 1952, Serial No. 272,354, now Patent No. 2,745,669, dated May 15, 1956. Divided and this application April 14, 1954, Serial No. 423,058

4 Claims. (Cl. 77—40)

This invention relates to tapping machines of the type adapted to cut an opening in a fluid chamber to provide an outlet therefrom, and to thread the cut opening to receive a valve body for controlling flow through the outlet or to receive a service T for connecting branch lines to the fluid chamber. Such operations are customary, for example, in attaching lateral or branch line connections to a fluid conduit, such as a water or a gas main.

In particular, this invention pertains to improvements in a machine of the type disclosed in United States Patent No. 2,291,979 to Mueller et al. This application is a division of our copending application, Serial No. 272,354, filed Februray 19, 1952, now Patent No. 2,745,669 issued May 15, 1956.

The machine disclosed in the aforementioned patent, while outstandingly successful for its intended purpose, possesses a number of operating disadvantages. Additionally, such machine is susceptible of simplification and other improvements which increase its service life and facilitate its operation. For example, it has been found in service operation of such machine that the construction of the harp, to which is attached the chain that secures the machine to a main, unduly wore the chain links and resulted in early breakage of the same.

Therefore, it is an object of this invention to provide an improved chain connection for a machine of the type under consideration, which connection not only increases chain life, but also facilitates the connection and disconnection of the chain from the machine.

Other objects and advantages of the invention will become apparent from the following description and accompanying drawings, in which:

Figure 1 is a central vertical sectional view of a tapping machine embodying this invention attached to a main and showing the position of the parts at the termination of a tapping operation.

Figure 2 is a fragmentary perspective view of the machine shown in Figure 1.

Figure 3 is a top plan view of the machine shown in Figure 1.

Figure 4 is a fragmentary elevational view of the machine illustrating the chain yoke and the connection of the ends of the machine-supporting chain thereto. Parts are broken away to illustrate details more clearly.

Figure 5 is a fragmentary cross-sectional view taken substantially on line 5—5 of Figure 4.

Figure 6 is a perspective view of the washer interposed between the chain yoke and the tension nut on the chain harp.

Referring now to the drawings, there is shown in Figure 1 a curved wall chamber, such as a gas or water main 20, having mounted thereon the usual malleable iron saddle 22 with a gasket 24 interposed therebetween. The saddle 22 has an opening 26 therethrough that is counterbored at its outer end, as at 28, to receive a flop valve housing 30. A gasket 32 is interposed between the saddle 22 and the housing 30.

The housing 30 is hollow and bulges outwardly at one side thereof to form a lateral enlargement 34 for reception of a flop valve 36 when the latter is in its open or inoperative position, as best shown in Figure 1. The flop valve 36 is carried by a shaft 38 journalled in the walls of the housing 30 so that when the shaft is turned by an exterior handle 40 the flop valve is moved between open and closed positions. The upper end of the flop valve housing is interiorly threaded, as at 42, for reception of one end of a cylinder 44 which, together with the valve housing 30, constitutes the barrel 46 of the machine. The upper end of the cylinder 44 is closed and sealed by a gasketed bonnet or cap 48 having a top 50 from which projects a cylindrical upward extension 52 and a depending annular skirt 54 that is interiorly threaded for engagement with outer threads on the upper end of the cylinder. Thus, the barrel 46 and the cap 48 form an interior fluid chamber 56.

Extending through the cylindrical extension 52 of the bonnet 48 is a boring bar which is adapted for rotary and axial movement within the fluid chamber 56. Suitable packing 60 is interposed between the boring bar 58 and the cap extension 52. The upper end of the boring bar 58 is squared, as at 62, for reception of a ratchet wrench 64 for rotating the bar and is provided, below its squared end, with a shoulder 66, against which seats a feed-regulating thrust collar 68 conventionally retained on the bar by a locking set screw 70. A yoke 72 of well-known construction is pivotally carried by a feed collar 74 threadedly mounted on the cylindrical extension 52 of the cap, and the upper end of the yoke contacts the top of the thrust collar 68 to thereby impart a downwardly longitudinal force thereto when the feed collar is rotated by radial handles 76 thereon. The upper end of the yoke 72 is substantially U-shaped, as best shown in Figure 1, to embrace the bar 58 when in engagement with the thrust collar 68.

The thrust collar 68 has a depending cylindrical sleeve 78 having relatively-fine regulating threads 80 thereon which are engageable with complementary inner threads in the upper end of the cylindrical cap extension 52. These threads 80 are of the same pitch as the threads 82 on the cutting and tapping tool 84 (later described) carried by the inner end of the boring bar 58 and are much finer than the threads on the exterior of the extension 52. In use, the yoke 72 and feed collar 74 are employed to impart a longitudinal thrust to the tool 84 during the operation of the latter to cut an opening in the main 20. After such opening has been cut, the threads 80 on the thrust collar 68 and in the cap extension 52 are engaged and the operation of tapping the opening by the tool 84 proceeds.

A by-pass valve 86 is mounted on the flop valve housing 30 and is employed to control communication between the portions of the fluid chamber 56 above and below the flop valve seat 88 to facilitate both tight engagement of the flop valve 36 with its seat and subsequent opening of such valve.

The barrel 46 is held against the saddle 22 by means of a chain 90 extending about the main 20 and having its opposite ends secured to the barrel.

The construction thus far described is relatively conventional, and since its operation is set forth in detail in the aforementioned Mueller et al. patent, no further description is necessary.

In order to securely hold the machine in operative position on a main 20, there is provided a chain yoke 154 comprising a collar 156 which rests against an upwardly-facing exterior shoulder 158 on the barrel 46 provided by one end of the flop valve housing 30. On diametrically-opposite sides of the collar 156, there are provided parallel pairs of outwardly-extending lugs 160 having opposed flat inner side faces 162 and arcuately-recessed upper surfaces 164. The chain 90 is adapted to pass around the main 20 and to have its opposite ends detachably connected to these lugs 160 on the chain yoke 154. Since the fastening means for each end of the chain are identical, a description of the fastening means on one end will suffice for both.

A chain harp 166 has a stem 168 projecting therefrom, which stem has an inner square portion 170 and an outer threaded portion 172, the latter portion being contained within the longitudinal projection of the inner square portion, that is, the threaded portion 172 does not project laterally beyond the square portion 170. A washer 174 having a square opening 176 therein, complementary to the square portion 170 of the harp stem, is mounted on the latter. The washer 174 is provided with projections 178 on opposite sides thereof that have arcuate surfaces complementary to and seating in the arcuate recesses 164 in the upper sides of the lugs 160 to permit rocking adjustment of the stem 168. The washer 174 also has a portion 180 which depends between the lugs 160 and is provided with opposed flat sides 182 that cooperate with the inner flat side faces 162 of the lugs to prevent turning of the washer between the lugs. Likewise, it will be seen that the square opening 176 in the washer 174 cooperates with the square portion 170 of the stem to prevent turning of the stem therein. A tension nut 184 is mounted on the threaded portion 172 of the stem and engages against the upper surface of the washer 174 for applying tension to the harp 166, and to the chain 90, to tightly seat the drilling machine on the saddle 22. It will be noted that the depending portion 180 of the washer completely encloses the threaded portion 172 of the stem positioned between the lugs 160, to thereby protect the stem threads against engagement with the lugs.

From service use of the chain harp shown in the aforementioned Patent No. 2,291,979, it has been found that the chain link which is engaged in the slot in the harp is under an excessive bending or compressive strain and also tends to wear unduly at its point of engagement with the bottom of the slot, with the result that the link ultimately breaks at this point. In order to eliminate this disadvantage, the harp 166 shown herein is bent in its plane at an obtuse angle, preferably about 120°, substantially at the junction of the narrow slot 186 with the large opening 188. Hence, that link 190 of the chain 90 which passes through the slot 186 is under no excessive bending or compressive strain. The link 192 immediately above the slot 186 is under a bending strain, but since this link engages the harp 166 on opposite sides of the narrow slot and also since such strain is exerted on the link 192 at its strongest point, i. e., its curved end portion, no undue wear or breakage of the link occurs.

It will thus be seen that the objects of this invention have been fully and effectively accomplished by the provision of a drilling machine of improved design. It will be realized, however, that the specific embodiment of the invention which has been disclosed to illustrate the principles of the latter is susceptible of changes without departing from such principles. Therefore, this invention includes all modifications encompassed by the spirit and scope of the following claims.

We claim:

1. In a drilling machine having a barrel adapted to have its inner end sealed against a main and flexible means adapted to engage the wall of the main opposite the barrel and to have its ends secured to the latter, the combination comprising: a stem constituting at least one of the ends and having an inner portion provided with a flat side and an outer threaded portion contained within the longitudinal-projected outline of said inner portion; anchoring means on the barrel providing an opening having a flat side wall and in which opening the stem is longitudinally movable to tension said flexible means, said anchoring means presenting an abutment surface for engagement with a washer on said stem; and a washer on said stem engaging said abutment surface and having a portion depending within said opening, the opening in said washer having a flat side wall for cooperation with said flat stem side to prevent turning of said washer on said stem and said depending washer portion having a flat side for cooperation with said flat side wall in said anchoring means opening to prevent turning of said washer in the latter, said washer also having an abutment surface for a tensioning nut threaded on said stem threaded portion.

2. The structure defined in claim 1 in which the depending washer portion extends through the anchoring means opening.

3. In a drilling machine having a barrel adapted to have its inner end sealed against a main and flexible means adapted to engage the wall of the main opposite the barrel and to have its ends secured to the latter, the combination comprising: a stem constituting at least one of the ends and having an inner portion provided with a flat side and an outer threaded portion contained within the longitudinally-projected outline of said inner portion; anchoring means on the barrel providing an opening having a flat side wall and in which opening said stem is longitudinally movable to tension said flexible means, the anchoring means presenting an abutment surface for engagement with a washer on said stem; and a washer on said stem engaging said abutment surface and having a portion depending within said opening, the opening in said washer having a flat side wall for cooperation with said flat stem side to prevent turning of said washer on said stem and said depending washer portion having a flat side for cooperation with said flat side wall in said anchoring means opening to prevent turning of said washer in the latter, the engaged abutting surfaces of said washer and said anchoring means being complementary arcuate about a center of curvature normal to said flat side wall of said anchoring means opening to permit pivotal adjustment of said stem, and said washer also having an abutment surface for a tensioning nut threaded on said stem threaded portion.

4. In a drilling machine having a barrel adapted to have its inner end sealed against a main and flexible means adapted to engage the wall of the main opposite the barrel and to have its ends secured to the latter, the combination comprising: a stem constituting at least one of the ends and having an inner portion provided with opposed flat sides and an outer threaded portion contained within the longitudinally-projected outline of said inner portion; a pair of parallel radial lugs on the barrel having opposed flat inner faces and arcuate recesses in their upper sides; and a washer on said stem having arcuate surface portions engaged in said lug recesses for pivotal adjustment of said washer about an axis normal to said opposed lug faces, the opening in said washer having opposed flat side walls for cooperation with said stem flat sides to prevent said stem from turning in said washer and said washer having a portion depending between said lugs and provided with opposed flat sides cooperating with said opposed lug faces to prevent said washer from turning between said lugs, said washer further having an abutment surface for a tensioning nut threaded on said stem threaded portion.

References Cited in the file of this patent

UNITED STATES PATENTS

| | | |
|---|---|---|
| 855,907 | Shaw | June 4, 1907 |
| 1,528,798 | Stenman | Mar. 10, 1925 |
| 2,302,793 | Mueller | Nov. 24, 1942 |